US012375587B2

(12) United States Patent
Wang et al.

(10) Patent No.: US 12,375,587 B2
(45) Date of Patent: Jul. 29, 2025

(54) MESH NETWORK-ON-A-CHIP (NOC) WITH HETEROGENEOUS ROUTERS

(71) Applicant: Western Digital Technologies, Inc., San Jose, CA (US)

(72) Inventors: Qingbo Wang, Irvine, CA (US); Mitchell Robert Fream, Germantown, MD (US); Adarsha Balaji, Philadelphia, PA (US); Martin Lueker-Boden, Fremont, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 453 days.

(21) Appl. No.: 17/714,793

(22) Filed: Apr. 6, 2022

(65) Prior Publication Data

US 2023/0325345 A1 Oct. 12, 2023

(51) Int. Cl.
*H04L 69/18* (2022.01)
*G06F 13/42* (2006.01)
*G06F 15/78* (2006.01)

(52) U.S. Cl.
CPC .............. *H04L 69/18* (2013.01); *G06F 13/42* (2013.01); *G06F 15/7825* (2013.01); *G06F 2213/0026* (2013.01)

(58) Field of Classification Search
CPC ...................................................... H04L 69/18
See application file for complete search history.

(56) References Cited

U.S. PATENT DOCUMENTS

| | | | |
|---|---|---|---|
| 9,160,627 B2 | 10/2015 | Kumar et al. | |
| 9,742,630 B2 | 8/2017 | Philip et al. | |
| 9,774,498 B2 | 9/2017 | Kumar et al. | |
| 11,023,377 B2 | 6/2021 | Kumar | |
| 11,412,075 B2 * | 8/2022 | Patrick | H04L 47/2441 |
| 2012/0147567 A1 * | 6/2012 | Lee | H05K 1/181 361/729 |
| 2015/0117261 A1 * | 4/2015 | Kumar | G06F 30/39 370/255 |
| 2017/0046198 A1 | 2/2017 | Solihin | |
| 2019/0138493 A1 * | 5/2019 | Teh | G06F 15/7825 |

(Continued)

*Primary Examiner* — Jason E Mattis
(74) *Attorney, Agent, or Firm* — LOZA & LOZA, LLP; Gabriel Fitch

(57) ABSTRACT

A mesh network-on-a-chip (NOC) with heterogenous routers for use with homogenous processing elements. Some of the routers are configured differently from other routers to interface more efficiently with particular physical resources that the processing elements require, such as particular input/output or memory devices. For example, one router is configured for use with the Peripheral Component Interconnect Express (PCIe) protocol, whereas another router is configured for use with the InterLaken communication protocol. Still further, the overall system is configured so that the various physical resources are physically adjacent to the particular router that is designed to access the resource to help ensure fair access by each processing element of the NOC to the particular resources that are required. The NOC may be part of a large manycore system on field programmable gate array (FPGA). The methods and apparatus described herein are generally applicable to all system-on-a-chip (SOC) designs.

30 Claims, 10 Drawing Sheets

(56) References Cited

U.S. PATENT DOCUMENTS

| | | | |
|---|---|---|---|
| 2019/0266088 A1* | 8/2019 | Kumar | G06F 15/7825 |
| 2020/0311200 A1* | 10/2020 | Dubeyko | G06N 3/063 |
| 2023/0207471 A1* | 6/2023 | Mallik | H01L 25/0657 |
| | | | 257/734 |

* cited by examiner

MESH NETWORK-ON-A-CHIP (NOC) WITH HETEROGENEOUS ROUTERS

FIELD

The disclosure relates, in some aspects, to interconnections for system-on-a-chip (SOC) architectures and is generally applicable to all SOC designs. More specifically, but not exclusively, the disclosure relates to network-on-a-chip (NOC) designs for manycore implementations on large field programmable gate arrays (FPGAs).

INTRODUCTION

A network-on-a-chip (NOC) is an interconnection infrastructure, usually on a single silicon chip, that implements the communication features of large-scale to very large-scale integration systems. For example, a NOC may include routers that interconnect an array of processing elements (e.g., general purpose computing cores or specific intellectual property (IP) cores) to one another and to various physical resources (e.g., input/output devices or memory devices). Collectively, the NOC, the many processing elements, and the various physical resources may be regarded as a system-on-a-chip (SOC). A mesh NOC is a NOC on which processing elements or nodes may be linked to branch off other processing elements or nodes. Mesh network topologies create multiple routes for information to travel among connected nodes while permitting different types of processing at the nodes. Large mesh networks may enable multicore implementations or manycore implementations, where a manycore implementation often includes thirty or more processing cores or nodes. Individual routers may be provided in connection with each of the processing elements or nodes to facilitate routing of information between and among the many processing cores or nodes. NOCs may be implemented within field programmable gate arrays (FPGAs). Issues can arise, especially in manycore mesh NOCs, in the placement and routing of the FPGA to permit the many processing cores of the SOC to have proper access to various resources such as input/output resources to achieve proper timing closure or to satisfy other requirements.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a network-on-a-chip (NOC). The NOC includes: a network of routers, each router configured for use with a corresponding processing element of a plurality of processing elements, the network of routers and the plurality of processing elements spanning multiple dies; wherein the routers of the network are interconnected to couple the processing elements to one another through the routers; wherein a first router of the network is configured to use a first physical resource and a first communication protocol; and wherein a second router of the network is configured to use a second physical resource and a second, different communication protocol. In some aspects, the first physical resource may be used to communicate with a device at an opposing end of a communication channel, and the second physical resource may be used to communicate with a device at an opposing end of another communication channel. In some examples, the first and second routers are configured to use the same communication protocols (though linked to different physical resources). In other examples, the first and second communication routers are configured to use different protocols. In some aspects, the physical resources may be input/output (I/O) resources or memory resources. In some aspects, the processing elements, the physical resources, and the NOC collectively form a SOC. In some aspects, the NOC is a mesh NOC. In some aspects, the routers of the NOC are formed on an integrated circuit in proximity to the particular physical resources they are configured to manage, which may be on a different die of the multiple dies.

In another aspect of the disclosure, a method for providing a NOC includes: providing a network of routers, each router configured for use with a corresponding processing element of a plurality of processing elements, the network of routers and the plurality of processing elements spanning multiple dies, wherein a first router of the network is configured to use a first physical resource and a first communication protocol, and wherein a second router of the network is configured to use a second physical resource and a second, different communication protocol; and interconnecting the routers of the network to facilitate coupling of the processing elements to one another through the network of routers and to facilitate coupling the processing elements to the first and second physical resources through the first and second routers. In some aspects, the NOC is a mesh NOC.

In yet another aspect, an integrated circuit includes: a plurality of physical resources; a plurality of processing elements that each comprise a common physical configuration; a network of routers, each router configured for use with a corresponding processing element of the plurality of processing elements; wherein the routers of the network are interconnected to couple the processing elements to one another through the routers; and wherein at least one of the routers has a different physical configuration from other routers in the network and is configured for use with a particular one of the physical resources. In some aspects, the integrated circuit is a SOC. In some aspects, the NOC is a mesh NOC.

Still another aspect of the disclosure provides a NOC that includes: a network of routers, each router configured for use with a corresponding processing element of a plurality of processing elements; wherein the routers of the network are interconnected to couple the processing elements to one another through the routers; wherein a first router of the network is configured to use a first physical resource and a first communication protocol; and wherein a second router of the network is configured to use a second physical resource and one or both of the first communication protocol and a second, different communication protocol. In some aspects, the processing elements, the physical resources, and the NOC collectively form a SOC. In some aspects, the NOC is a mesh NOC. In some aspects, the routers of the NOC are formed on an integrated circuit in proximity to the particular physical resources they are configured to manage.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

Figure 1:
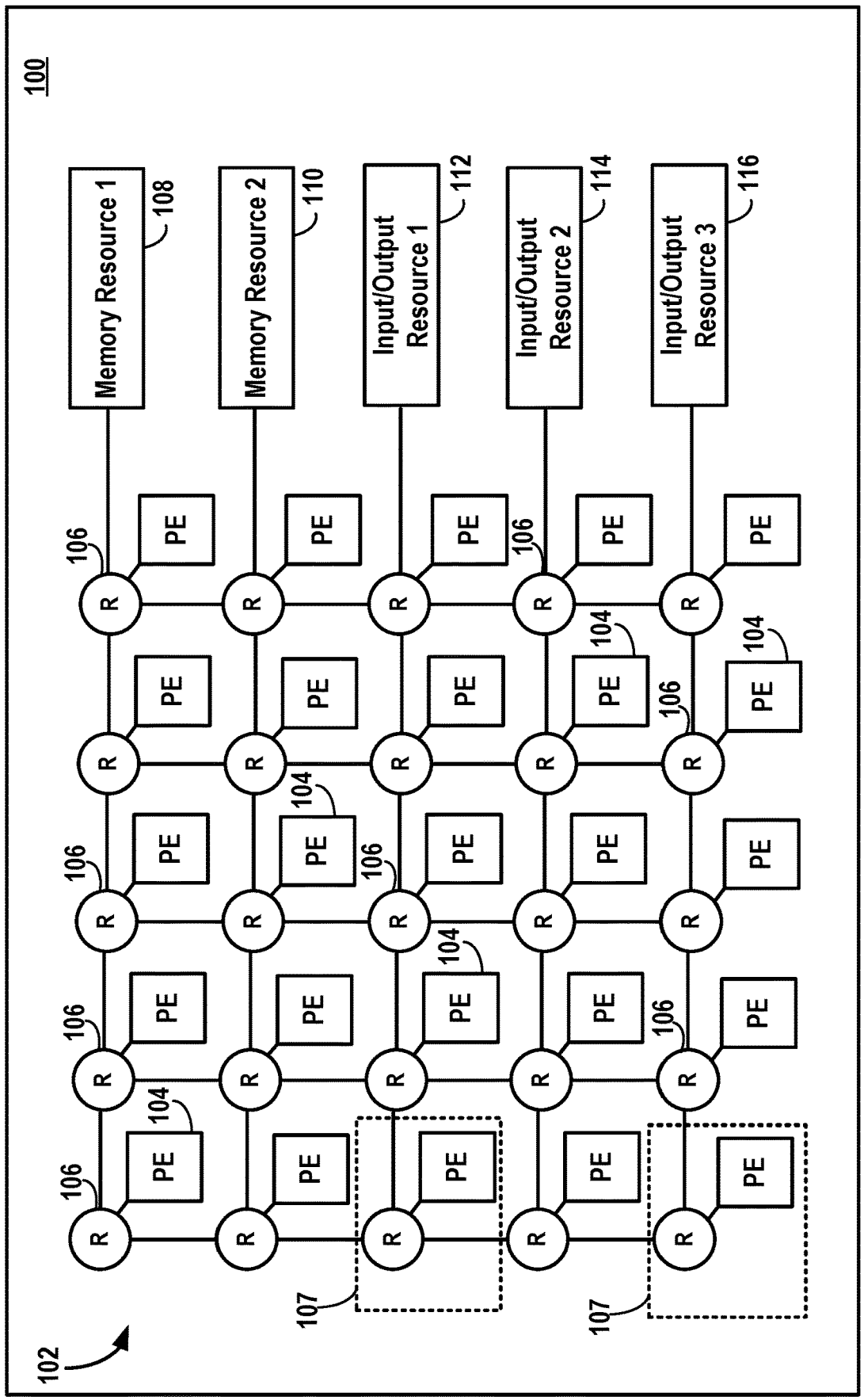
FIG. 1 illustrates an exemplary integrated circuit that includes a network-on-chip (NOC) and various physical resources that the NOC accesses, wherein the NOC has homogenous processing elements and homogenous routers.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to circuits, systems, methods and apparatus for implementing a network-on-a-chip (NOC), particularly a NOC for use with a multi-core/many-core system configured as a field programmable gate array (FPGA) or application specific integrated circuit (ASIC). Herein, multi-core refers to systems with two to eight processing cores (or processing elements). Many-core refers to systems with more than eight processing cores (or processing elements) and which may have, for example, twenty or thirty or more processing cores. Some many-core systems may have hundreds of processing cores. For example, supercomputers may consist of dozens or hundreds of server stacks, each containing dozens of CPUs on motherboards, and dozens or hundreds of SoCs on Peripheral Component Interconnect (PCI) cards, each having dozens of processing cores, all connected through NOCs, with the entire system configured to perform massive parallel processing to solve computationally intensive problems.

Overview

When designing mesh NOCs or other kinds of NOCs, there may be significant resource constraints, such as input/output (I/O) constraints, memory constraints, and constraints related to hard intellectual property (IP) components, i.e., hardwired circuit modules provided by vendors that form a part of the overall system-on-a-chip (SOC) in which the NOC is a component. Such constraints can affect both FPGA circuit designs and ASIC circuit designs. Still further, large FPGAs may be formed across multiple dies, with limitations imposed on the number and locations of wires crossing different dies. To allow all computing cores within the SoC to have fair (e.g., prompt and equal) access to the various physical resources of the FPGA or ASIC while achieving suitable timing closure can make the FPGA/ASIC place and route design stage a difficult task.

Among other features, what is described herein is a mesh NOC that has routers configured according to, incorporated along with, and closely associated with their nearby I/O or memory resources, which might be anywhere on a die, especially for FPGA. These routers are referred to herein as heterogenous routers. Notably, the heterogeneous routers can be internal to a mesh. This design is in contrast to designs where (mostly in design of ASIC), routers are homogenous and form an array of patterns, and the I/O and memory resources are placed along the border of the chip. Such resources are presented as a controller, I/O module, or interface module and are (inter)connected to NOC like a typical processing element. Homogeneous router designs are often acceptable for ASIC designs, but the heterogeneous designs and schemes described herein can give ASIC designers more opportunities to optimize their designs.

Among still other features, what is described herein is a mesh NOC that has routers configured adaptively in algorithms according to, incorporated along with, and closely associated with their nearby I/O or memory resources, which might be different in access characteristically. These routers are referred to herein as heterogenous routers. Notably, the heterogeneous routers can execute artificial intelligence (AI) or non-AI prediction of data access, so as to conduct prefetching or caching for the processing elements that need data from the corresponding memory/IO resources.

Note that herein, as the term is used herein, a "NOC" refers to a network of routers, links between the routers, and interfaces between the routers and processing elements (e.g., general purpose computing cores or IP cores). That is, the processing elements are not part of the NOC but are interconnected by the NOC. Collectively, the NOC, the many processing elements, and the various physical resources may be regarded as a system-on-a-chip (SOC). Herein, by a "general purpose" processing core, it is meant that the processor can be programmed for general computational processing and is not dedicated or hardwired for any specific functions (as with an ASIC). Note also that NOCs can be implemented in a variety of different topologies, such as ring, tree, crossbar, bus, mesh, etc. Although the following descriptions are primarily directed to mesh NOCs, at least some aspects of the disclosure may be applicable to other topologies.

FIG. 1 illustrates an exemplary simplified integrated circuit (IC) 100, which may be designed as an ASIC or as part of an FPGA-based system. The integrated circuit 100 includes a NOC 102, a set of processing elements (PEs) 104, and a set of physical resources, including memory resources and I/O resources. The IC 100 may also be regarded as a SOC. The PEs 104 are arranged in a rectangular grid pattern or array and represent uniform or homogenous processing elements (or processing cores). The NOC 102 includes an array of routers 106, each directly coupled to a corresponding/local router 106, which may also be uniform or homogenous. That is, each processing element 104 is configured substantially the same as every other processing element 104 and each router 106 is configured substantially the same as every other router 106. The routers 106 are interconnected as shown by communication channels (which form part of the NOC 102) to allow for data, commands, or other signals to be transferred among the processing elements 104 to perform an overall computation as specified by the collective logic programming of the many processing elements 104, such as neuromorphic computations intended to mimic neuro-biological architectures in a nervous system, image recognition computations, language processing computations, healthcare computations (such as those involved in monitoring movement of the elderly to detect possible healthcare issues), and other AI processing computations, etc. That is, in operation, the various processing elements 104 can be programmed with different logic to perform different aspects of an overall computation, where the integrated circuit 100 may be one IC or stack of dies or chiplets of an overall system, such that it conducts parallel processing. Depending upon the particular operations, the particular processing elements 104 may need to access different physical resources. Although not shown in FIG. 1, additional communication channels may be provided around the perimeter of the NOC that connect to each of the perimeter routers.

Note that each processing element (or processing core) 104 and its corresponding router 106 of the NOC 102 form a processing element-router pair 107 (or processing element-router module or node). Selected processing element-router pairs 107 are identified as such in FIG. 1. Each processing element may be, for example, a general-purpose programmable computer processor (or processing module or core) of the type that might otherwise be employed as the central processor of a computing system but is used as just one processor of the IC 100. In other examples, each processing element may be a tensor processing unit (TPU).

In the example of FIG. 1, the integrated circuit 100 includes Memory Resource 1 (108) and Memory Resource 2 (110) and to I/O Resource 1 (112), I/O Resource 2 (114), and I/O Resource 3 (116). The Memory Resources may be, for example, static memories or dynamic memories (and may be volatile memories or non-volatile memories). The I/O resources 112, 114, 116 allow the processing elements 104 to send/receive data to/from external devices, not shown, such as to a host computer. The physical resources 108-116 may also be referred to as external resources since they are separate from the PEs 104 and the NOC 102. At the same time, these physical resources are internal to the integrated circuit 100.

The various physical I/O resources or memory resources of FIG. 1 may employ or require different I/O or communication protocols, such as InterLaken (ILKN) communication protocol (which is optimized for high-bandwidth packet transfers), Aurora protocol for use with a FIREFLY-connected device (where FIREFLY is a mechanical connection technology of Samtec, Inc. comprising sockets, connectors, and cables), cooperative medium access control (CMAC) protocol (for Ethernet communications), Peripheral Component Interconnect Express (PCIe) protocol, Double Data Rate (DDR) protocol, or other high performance input/output protocols. They may employ or require different transceiver technologies, such as high performance 10 (HPIO), GTY transceiver, GTR transceiver, on some FPGAs. Some of these components may be implemented as hard IP cores on an FPGA but are not as programmable as those reconfigurable fabrics on an FPGA chip. They are, however, usually relatively smaller in footprint and consume minimal power compared to when they are made with reconfigurable logic. On an FPGA chip or die, they are usually distributed evenly in space. Note that hard IP is a way to implement certain protocol/interfaces on FPGA to access memory or I/Os.

As shown in FIG. 1, the various exemplary resources on the integrated circuit die are physically closer to some of the processing elements 104 than others. As such, the communication times between the various processing elements 104 and the various resources may differ significantly, hindering fair access by some of the processing elements 104 to the resources. Moreover, since the various resources may use different I/O protocols, the routers 106 (which are of a uniform and homogeneous design) may need to be configured to accommodate whatever different I/O protocols are needed to allow the processing elements 104 to communicate with and use the various required resources.

Note that a bus system (not shown in FIG. 1) might be used to allow generic routers to communicate with various resources that have different I/O protocols, with the bus handling the I/O protocol conversions. However, the need to use a bus and corresponding bus protocols to route data within the system can introduce significant transmission delays and the like, especially for complex many-core systems with numerous processing elements and numerous resources that employing different I/O protocols. Alternatively, in some systems, interconnections might be achieving by hopping from node to node but this can be complicated and time consuming, as well. The fair access problem can be mitigated in some systems by stacking integrated circuit dies on top of one another to place resources in closer proximity to processing elements, but this can add further complications and costs by requiring interconnections from one die to another to allow processing elements on one particular die to access resources on other dies of the stack. The interconnections can include interposers or through silicon vias (TSVs). Such interconnections can limit the available resources for super logic regions (SLRs) in some stacked devices. Generally speaking, interconnections across dies are expensive in terms of FPGA design. Busses again might be employed to route data and commands among the various components of the overall system, but such can introduce even more significant transmission delays within multiple die systems.

If the NOC 102 is intended to be part of an ASIC that is not too complex, the ASIC may be manually designed (e.g., hand routed) to arrange components and connection lines to provide fair access to the various processing elements while also meeting any timing closure requirements, but this can become difficult with large FPGAs that employ multicore or many-core designs. Note also that merely placing particular resources physically close to the particular processing elements that require the resources (such as immediately below the processing element on an adjacent die of a multi-stack die) does not necessarily solve these problems, since the routers are all uniform, and so a bus system still may be needed to provide the required I/O protocol conversions to allow generic routers to communicate with the particular resources.

Note also that some mesh NOC designs may employ crossbars to enable fanout from one resource to many requestors (e.g., to many processing elements), but this adds design complexities as well. Still further, note that the individual processing elements (or processing modules) may include local dedicated memory as part of the processing elements, such as a local cache. Nevertheless, these processing elements may still require access to other physical resources through the NOC, resulting in the same issues discussed above.

Herein, NOC designs and architectures are provided that address these and other issues. In some aspects, a NOC architecture is provided wherein the routers are not of a uniform and homogenous design, but rather are heterogenous. That is, the various routers of the NOC can be physically configured differently to interface more efficiently with the particular resources that their corresponding processing element need. For example, if a particular processing element needs to access a physical resource that uses PCIe, the corresponding router within the NOC may be configured specifically for PCIe. If another of the processing elements needs to access a resource using the Aurora protocol, the corresponding router may be configured specifically for use with Aurora. Still further, the overall system may be configured so that the various resources are physically adjacent to the particular processing element that requires the resource. This can help ensure fair and prompt access by each processing element to the particular resources it requires. Notably, since the routers in this architecture are uniquely configured for use with particular I/O protocols of particular resources, no bus is needed to handle data transfer and protocol conversions. Hence, the various processing elements can access the resources they need much more quickly.

In some aspects, the foregoing is achieved by providing a NOC formed in an integrated circuit, wherein the NOC includes a network of routers, with each router coupled to a corresponding processing element (such as a general processing cores). The routers of the processing element-router pairs are interconnected to the routers of other ones of the processing element-router pairs to couple the processing elements to one another through the routers. The processing elements all share a common physical configuration (e.g., the processing elements are substantially homogenous). However, at least one of the routers has a different physical configuration from other routers in the NOC and is configured for use with a particular physical resource. Indeed, many of the routers have different physical configurations from other routers in the NOC for use with a variety of different physical resources (e.g., the routers are heterogenous). All of the routers also share basic functions that allow for passing of data and commands among the nodes of the NOC.

In an illustrative example, a router connected to a processing element that needs to access a PCIe-based resource is configured for use with PCIe, so that the router can efficiently interface the processing element with that particular resource. Likewise, a router connected to a processing element that needs to access a FIREFLY-connected resource is configured for use with FIREFLY, so that the router can efficiently interface the processing element with that particular resource. Notably, these routers are also configured to communicate with the other routers in the NOC to permit the various processing elements to exchange information as needed. For example, a router configured for use with PCIe is not limited only to PCIe but provides PCIe interface capability in addition to any interface capabilities appropriate for interfacing with the other routers in the NOC. The processing element-router pairs that have routers that accommodate particular I/O protocols may be regarded as optimized pairs because the routers are individually configured based on the needs of the processing element of the pair. Other routers within the NOC may be "non-optimized" generic routers that are configured with standard interface capabilities appropriate for interfacing with the other routers in the NOC. In some examples, the optimized processing element-router pairs may be positioned within the overall system at locations that are physically adjacent to the resources that the pair needs to access so as to reduce data transmission times between the router and the resource. Note also that, in some examples, processing functions may be allowed to migrate to a processing element that is closer to its needed resources.

The examples primarily described herein include processing element-router pairs, where each pair has one processing element (or processing core) and one router. However, in other examples, two or more processing elements might be connected to a single router or a single processing element might be connected to two or more routers. Accordingly, herein, the term "processing element-router module" is used to refer to a module that includes one or more processing elements and one or more routers. Typically, each processing element-router module has one processing element and one router and hence is therefore referred to herein as a processing element-router pair. Moreover, as already explained, the processing elements are not part of the NOC itself, which includes the routers, links between the routers, and interfaces between the routers and the processing elements.

These and other features are discussed in detail with reference to the next figures.

Exemplary NOCs with Heterogenous Routers

Figure 2:
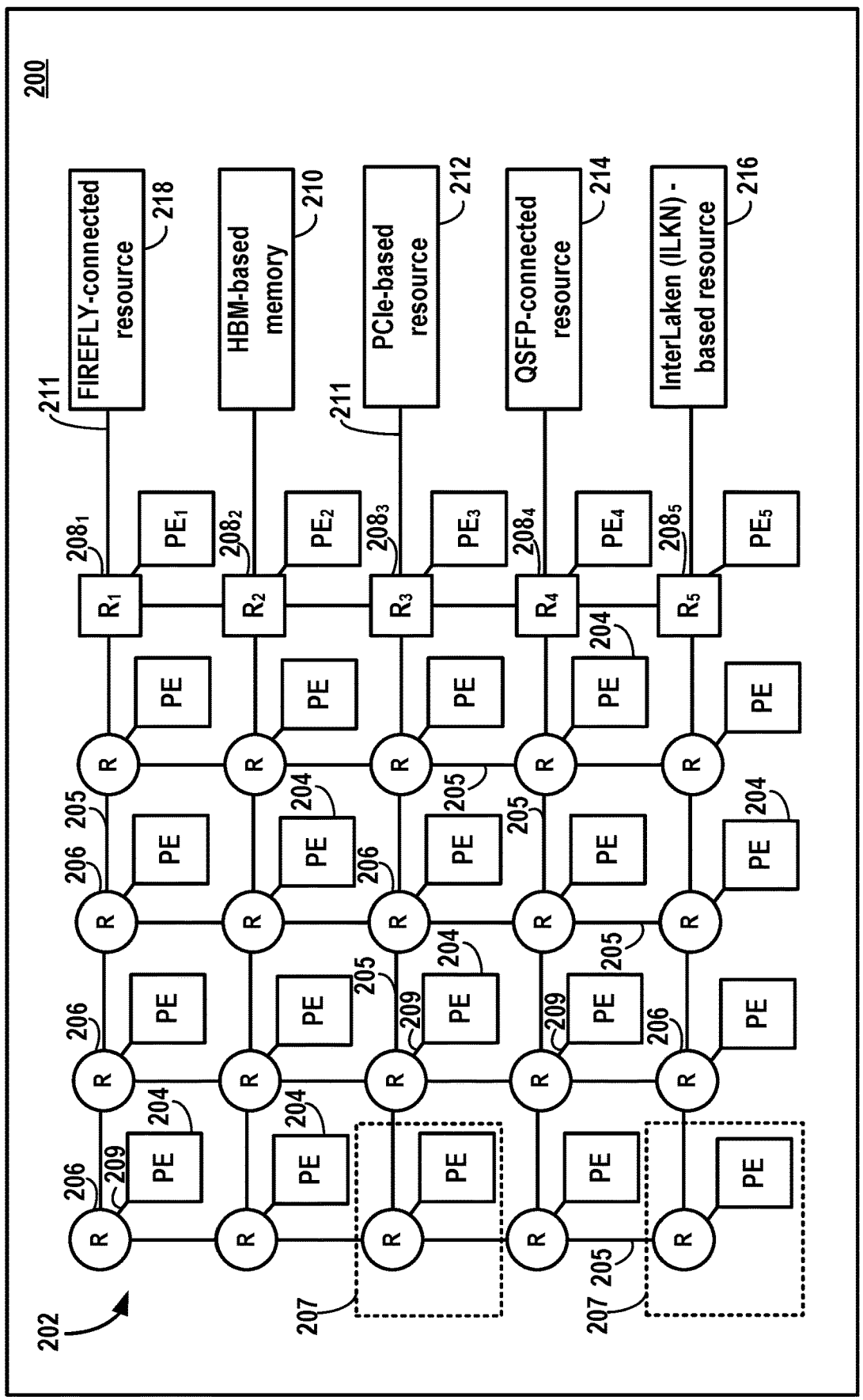
FIG. 2 illustrates an exemplary integrated circuit that includes a NOC and various physical resources that the NOC accesses, wherein the NOC has homogenous processing elements and heterogenous routers with different physical configurations.

FIG. 2 illustrates an exemplary simplified integrated circuit 200 having a NOC 202, which may be designed as an ASIC, FPGA, or as part of an FPGA-based system. The NOC includes heterogenous routers 206, 2081-2085, described more fully below. The integrated circuit 200 also includes a grid or array of substantially uniform or homogenous processing elements (PE) 204 (though they need not be completely identical). The NOC 202 includes interconnection lines or communication channels 205 that interconnect the routers 206, 2081-2085 to one another and also interconnection lines or communication channels 209 that connect the routers 206, 2081-2085 to corresponding processing elements 204, as shown. The processing elements 204 are thus not part of the NOC 202 but are interconnected by the NOC 202. The integrated circuit 200 also includes a set of physical resources 210, 212, 214, 216, and 218, such as memory resources and I/O resources. Collectively, the NOC 202, the PEs 204, and the physical resources 210, 212, 214, 216, and 218 form a SOC. In this example, the physical resources are arranged on the border of the chip. Other examples are provided below where the physical resources are provided within the NOC to more fully exploit a mesh NOC architecture.

The routers may be heterogenous. That is, the routers 2081-2085 are physically configured differently from each other and from the other routers 206 of the NOC 202. In particular, at least some of the routers 2081-2085 are configured for or adapted for use with different physical resources, and are connected to those physical resources by interconnection lines or communication channels 211. For example, the routers 2081-2085 may be configured for use with different I/O protocols to facilitate communication with corresponding resources that use those I/O protocols and to reduce processing burdens on the processing element of the pair. Other routers 206 are generic or uniform routers. Note that, although the homogenous processing elements might differ slightly from one another, the homogenous processing elements are far more uniform than the routers, which can differ significantly from one another.

All of the routers 206 and 2081-2085 are interconnected as shown via the interconnection lines or communication channels 205 to allow for data or other signals to be transferred among all of the processing elements 204 so as to perform an overall computation as specified by the collective logic programming of the many processing elements 204, such as neuromorphic processing, image recognition, feature extraction, AI processing, etc. That is, in operation, the various processing elements 204 can be programmed with (or configured with) different logic to perform different aspects of an overall computation. Depending upon the particular operations, the particular processing elements 204 may need to access different resources.

Note that each processing element (or processing core) 204 and its corresponding router 206 or 2081-2085 form a processing element-router module or processing element-router pair 207. Selected processing element-router pairs 207 are identified as such in FIG. 2. In the example of FIG. 2, each processing element-router module has one processing element (or processing core) and one router. As noted above, in other examples processing element-router modules might include two or more processing elements and/or two or more routers. Processing element-router modules that include a specialized router may be referred to as optimized modules (since the router is optimized for use with its corresponding processing element and the physical resources it needs). Processing element-router modules that include generic routers may be referred to as non-optimized modules.

In the example of FIG. 2: router $R_1$ 2081 is configured for use with the Aurora protocol to efficiently interface its corresponding processing element ($PE_1$) with a FIREFLY-connected resource 218 (e.g., a first physical resource having a first I/O protocol); router $R_2$ 2082 is configured for use with the HBM protocol to efficiently interface its corresponding processing element ($PE_2$) with a HBM-based memory 210 (e.g., a second physical resource having a second I/O protocol); router $R_3$ 2083 is configured for use with the PCIe protocol to efficiently interface its corresponding processing element ($PE_3$) with a PCIe-based resource 212; router $R_4$ 2084 is configured for use with the Ethernet protocol to efficiently interface its corresponding processing element ($PE_4$) with a QSFP-connected resource 214; and router $R_5$ 2085 is configured for use with the InterLaken (ILKN) protocol to efficiently interface its corresponding processing element ($PE_5$) with a ILKN-based resource 216. Note, all the I/O and memory resources are presented as "controller" or interface modules, connected to NOC, where the "controller" or interface modules are in charge of specific protocols needed to access the resources. With this configuration, the overall program logic loaded into the array of processing elements 204 may be tailored so that: processing functions that benefit from access to the FIREFLY-connected resource 218 are loaded into $PE_1$; processing functions that benefit from access to the HBM-based memory 210 are loaded into $PE_2$; processing functions that benefit from access to the PCIe-based resource 212 are loaded into $PE_3$; processing functions that benefit from access to the QSFP-connected resource 214 are loaded into $PE_4$; and processing functions that benefit from access to the ILKN-based resource 216 are loaded into $PE_5$.

In this manner, processing elements that require or benefit from particular resources (or those that are most efficient when implemented closest to the particular resources) are coupled to specialized routers configured for use with the I/O protocols of those particular resources to greatly reduce access time latencies and to improve fair access by those processing elements to the resources they need. Other processing modules that do not need frequent access to resources with particular I/O protocols may include generic or uniform routers. Note that those other processing modules can also access those resources via the various specialized routers by using the router interconnection channels, and this can be done without affecting the operation of the processing elements corresponding to those specialized routers. For example, a specialized router can retrieve data from a physical resource on behalf of one of the generic routers of the NOC and do so without affecting the operations of its own corresponding processing element. This can further improve overall processing times.

In the example of FIG. 2, the exemplary resources are all shown located adjacent to one side of the NOC and in physical proximity to the modified routers $R_1$-$R_5$, which are formed in a row on that side of the NOC. This is not often the case in practical systems. Generally speaking, the heterogenous routers may be located anywhere within the NOC grid, with suitable connections provided to the resources with which they interface. In some examples, the resources may be on other dies of a multiple die stack, or in some cases, on entirely separate components of a system of which a multiple die stack is one component.

The integrated circuit 200 of FIG. 2 may include numerous other features and circuits, not shown in the figure, including bus lines, clock lines, power lines, etc. Still further, the example of FIG. 2 shows that five of the routers of the NOC 202 are configured for particular I/O protocols. In other examples, more or fewer of the routers are so configured and, in some examples, each of the routers of the NOC 202 may differ from every other router of the NOC 202. Generally speaking, at least one of the routers is configured for use with a particular physical resource and has a different physical configuration than other routers in the NOC 202. Still further, particular routers may be configured for use with two or more I/O protocols, such as for use with both Ethernet and ILKN. Some or all of the processing modules may include their own dedicated local memory, such as a local cache and other local memory. FIG.

2 illustrates a two-dimensional mesh NOC topology but aspects of the disclosure are applicable to three-dimensional NOC topologies as well, such as a torus NOC.

Note that, in some aspects, the processing elements 204 provide a plurality of means for processing, each sharing a common physical configuration. The routers 206 provide a plurality of means for routing, at least two of which have different physical configurations for use with different physical resources. The interconnection lines or communication channels 209 provide a means for connecting each of the means for processing with a corresponding one of the means for routing. The interconnection lines or communication channels 205 provide a means for interconnecting the means for routing to couple the means for processing to one another through the plurality of means for routing to form a NOC. The connection channels 211 provide a means for connecting some of the means for routing to the physical resources.

Figure 3:
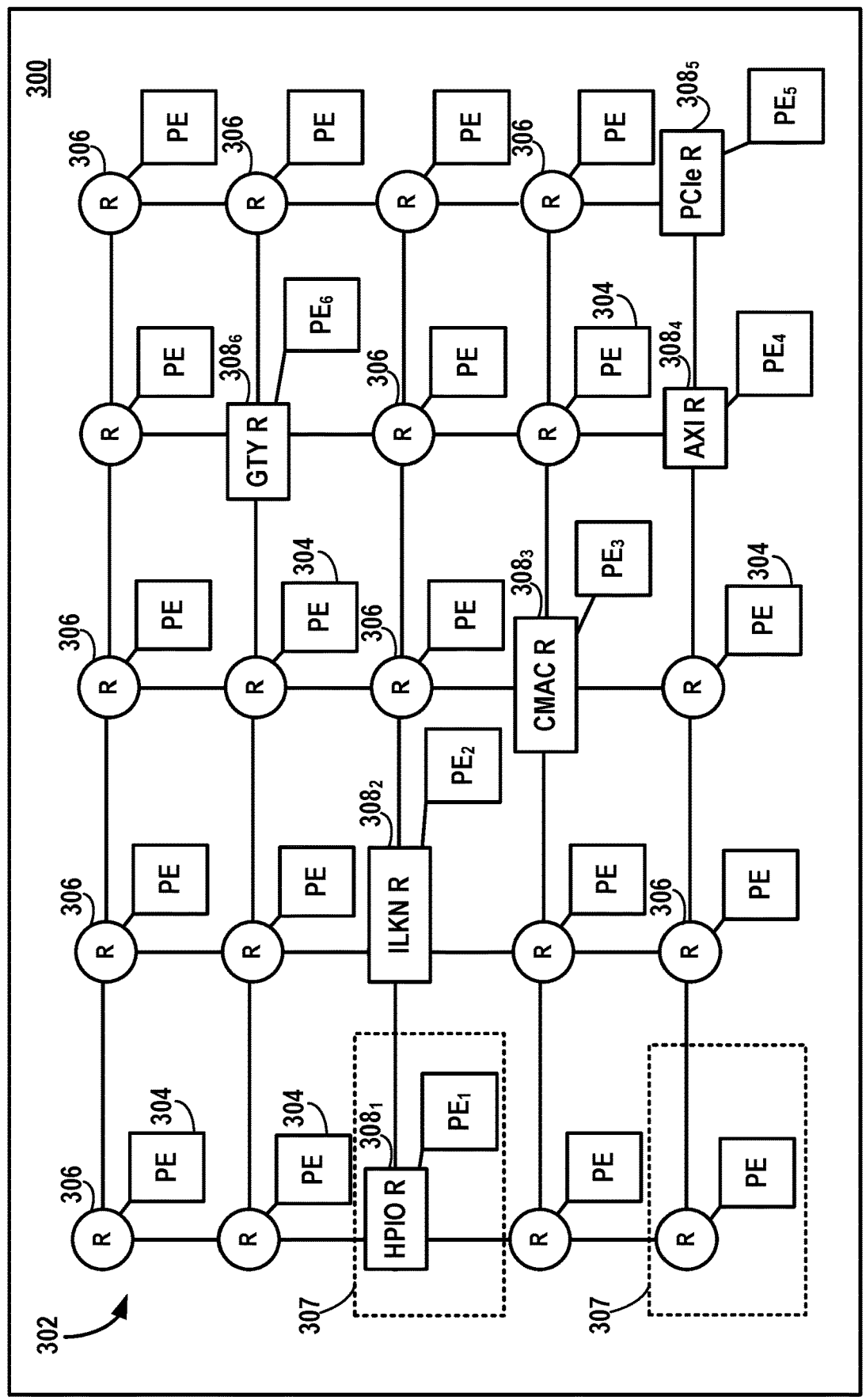
FIG. 3 illustrates another exemplary integrated circuit that includes a mesh NOC and various physical resources that the NOC accesses, wherein the NOC has homogenous processing elements and heterogenous routers with different physical configurations.

FIG. 3 illustrates an example where at least some of the heterogenous routers (which are separately configured for use with particular physical resources) are in the interior of a NOC. The particular resources (e.g., I/O or memory resources) that they interface with are not shown in FIG. 3 and may be, as already explained, formed on a separate die of a stack of dies. The integrated circuit 300 of FIG. 3 includes a mesh NOC 302 with a grid or array of heterogenous routers 306, 3081-3086 that are coupled to homogenous processing elements 304. That is, the routers 3081-3086 are configured differently from other routers 306 of the NOC 302. All of the routers 306 and 3081-3086 are interconnected as shown to allow for data or other signals to be transferred among all of the processing elements 304 so as to perform an overall computation as specified by the collective logic programming of the many processing elements 304. Each processing element (or processing core) 304 and its corresponding router 306 or 3081-3086 form a processing element-router module or processing element-router pair 307. Selected processing element-router pairs 307 are identified as such in FIG. 3. As noted above, in other examples the modules may include two or more processing elements and/or two or more routers. As also explained, the PEs 304 are not part of the NOC 302.

In the example of FIG. 3: HPIO router 3081 is configured for use with the HPIO protocol to efficiently interface its corresponding processing element ($PE_1$) with an HPIO-based physical resource (not shown); router ILKN R 3082 is configured for use with the ILKN protocol to efficiently interface its corresponding processing element ($PE_2$) with an ILKN-based physical resource (not shown); router CMAC R 3083 is configured for use with the CMAC protocol to efficiently interface its corresponding processing element ($PE_3$) with a CMAC-based resource 312 (not shown); router AXI R 3084 is configured for use with the AXI protocol to efficiently interface its corresponding processing element ($PE_4$) with an AXI-based physical resource 314 (not shown); router PCIe R 3085 is configured for use with the PCIe protocol to efficiently interface its corresponding processing element ($PE_5$) with an physical PCIe-based resource (not shown); and router GTY R 3086 is configured for use with the GTY protocol to efficiently interface its corresponding processing element ($PE_6$) with an physical GTY-based physical resource (not shown).

With this configuration, the overall program logic loaded into the array of processing elements 304 may be tailored so that processing functions that benefit from access to particular physical resources are loaded into the processing elements that are connected to the particular routers that are configured for use with the protocols of those resources.

Additionally or alternatively, during operation, the processing functions or tasks of one processing element may be migrated (moved) to another processing element that is closer to needed resources (for example, by adaptively and dynamically transferring software modules from one processing element to another) to optimize processing. Other processing elements within the NOC that do not need access to resources with particular I/O protocols may be generic or uniform routers 306. As with the example of FIG. 2, the integrated circuit 300 of FIG. 3 may include numerous other features and circuits, not shown in the figure, including bus lines, clock lines, power lines, etc. Still further, the example of FIG. 3 shows that six of the routers of the NOC 302 are configured for particular resources. In other examples, more or fewer of the routers are so configured and, in some examples, each of the routers of the NOC 302 may differ from every other router of the NOC 302. Still further, particular routers may be configured for use with two or more physical resources.

Figure 4:
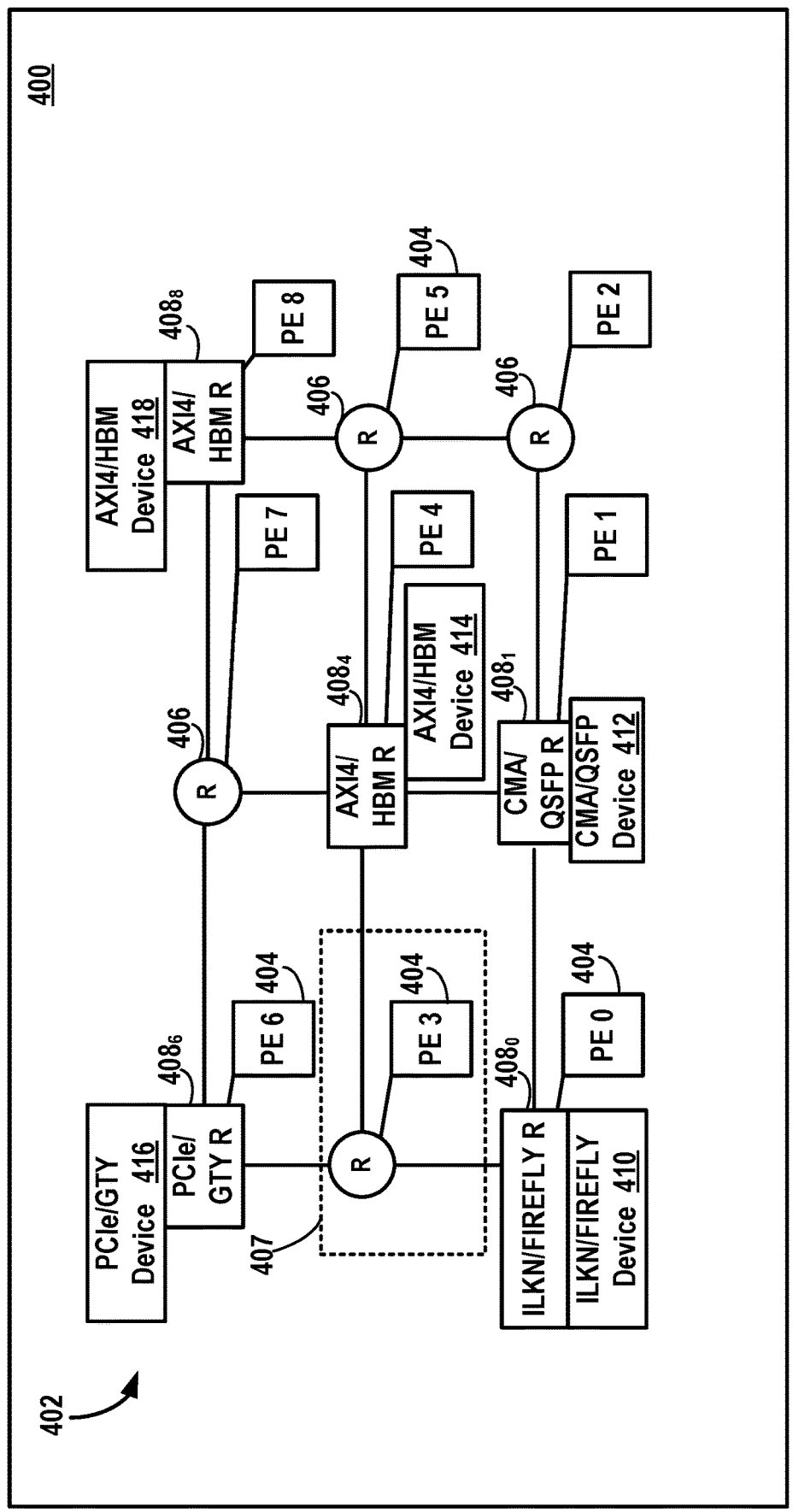
FIG. 4 illustrates an exemplary integrated circuit that includes a mesh NOC and various physical resources that the NOC accesses, wherein at least some of the heterogenous routers are located adjacent to particular physical resources accessed by the routers.

FIG. 4 illustrates an example where particular resources may be placed on, near, or within the NOC, for access by corresponding specialized routers. (The block diagram of FIG. 4 and the other figures herein are not to scale.) The integrated circuit 400 of FIG. 4 includes a mesh NOC 402 with routers 406, 4080-4088. The integrated circuit 400 also includes a grid or array of substantially homogenous processing elements 404, each coupled to a corresponding router of the NOC 402. In this example, the integrated circuit 400 includes nine processing elements, denoted PE 0-PE 8. Routers denoted by reference numeral 406 are uniform or generic routers. Other routers are configured for use with various I/O protocols, as shown. A router and its corresponding processing element for a processing element-router pair or module 407, one of which is specifically identified in the figure. As already explained, the various processing elements may have the same physical configuration but are loaded with different software for performing different portions of an overall computational procedure. Also, as explained above, the PEs are not part of the NOC but are interconnected by the NOC.

In the example of FIG. 4, ILKN/FIREFLY router 4080 is coupled to PE 0 and is configured for use with an adjacent ILKN/FIREFLY device 410. CMA/QSFP router 4081 is coupled to PE 1 and is configured for use with an adjacent CMA/QSFP device 412. AXI4/HBM router 4084 is coupled to PE 4 and is configured for use with an adjacent AXI4/HBM device 414. PCIe/GTY router 4086 is coupled to PE 6 and is configured for use with an adjacent PCIe/GTY device 416. AXI4/HBM router 4088 is coupled to PE 8 and is configured for use with an adjacent AXI4/HBM device 418. Note that ILKN and FIREFLY are on two different levels. ILKN is a protocol that can be implemented using softcore or hardcore IP (e.g., implemented in hardcore on Xilinx™ FPGA). When using ILKN to communicated between two chips, the wire/cable can be connected through FIREFLY, QSFP, or other type of connection solution. The same is true for the relation between CMA/QSFP, PCIe/GTY. HBM is a type of DRAM that is often already provided in a chip package and its controller can be connected to other components on FPGA through an AXI interface. As such, the listed pairs (e.g., ILKN/FIREFLY, CMA/QSFP, etc.) may be regarded as a single resource, rather than two separate resources. Note also that in FIG. 4, two of the heterogenous routers—routers 4084 and 4088—are both configured for AXI4/HBM, thus illustrating that the heterogenous routers do not each need to be different from one another. Interconnection lines between the routers and their corresponding adjacent physical resources are not shown in the figure.

Figure 5:
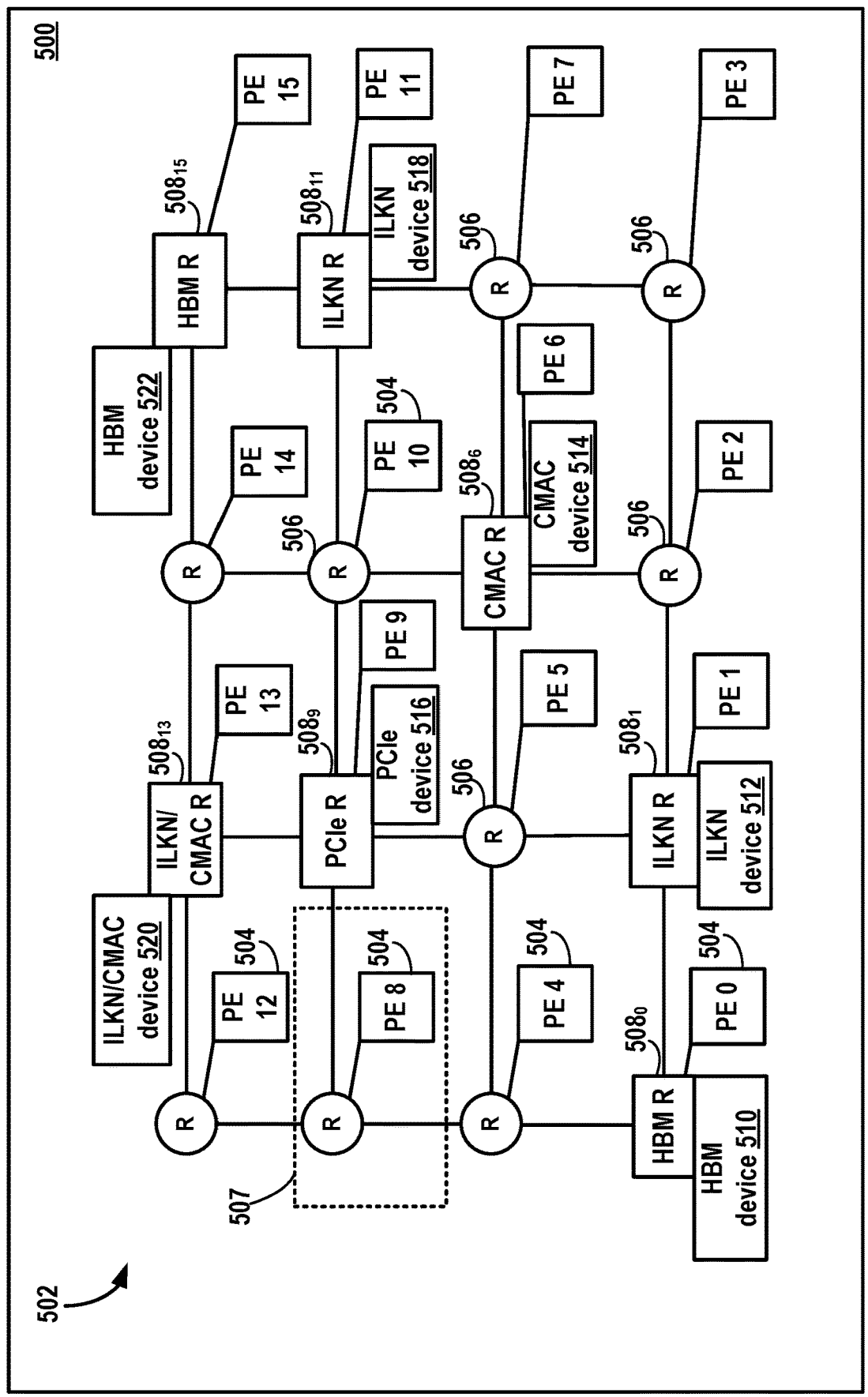
FIG. 5 illustrates another exemplary integrated circuit that includes a NOC and various physical resources that the NOC accesses, wherein at least some of the heterogenous routers are located adjacent to particular physical resources accessed by the routers.

FIG. 5 illustrates another example with heterogenous routers. As with FIG. 4, FIG. 5 also illustrates that particular resources may be placed on, near, or within the NOC, for access by corresponding specialized routers. The integrated circuit 500 of FIG. 5 includes a mesh NOC 502 with routers 5080-50815. The integrated circuit 500 also includes a grid or array of substantially homogenous processing elements 504, each coupled to a corresponding one of the routers. In this example, the integrated circuit 500 includes sixteen processing elements, denoted PE 0-PE 15. Routers denoted by reference numeral 506 are uniform or generic routers. Other routers are configured for use with various physical resources, as shown. A router and its corresponding processing element for a processing element-router pair or module 507, one of which is specifically identified in the figure. Interconnection lines (if needed) between the routers and their corresponding adjacent resources are not shown in the figure. As already explained, the various processing elements may have the same physical configuration but are loaded with different software for performing different portions of an overall computational procedure. Also, as explained above, the PEs are not part of the NOC but are interconnected by the NOC.

In the example of FIG. 5, HBM router 5080 is coupled to PE 0 and is configured for use with an adjacent HBM device 510. ILKN router 5081 is coupled to PE 1 and is configured for use with an adjacent ILKN device 512. CMAC router 5086 is coupled to PE 6 and is configured for use with an adjacent CMAC device 514. PCIe router 5089 is coupled to PE 9 and is configured for use with an adjacent PCIe device 516. ILKN router 50811 is coupled to PE 11 and is configured for use with an adjacent ILKN device 518. ILKN/CMAC router 50813 is coupled to PE 13 and is configured for use with an adjacent ILKN/CMAC device 520. HBM router 50815 is coupled to PE 15 and is configured for use with an adjacent HBM device 522.

By providing heterogenous routers, fair access can often be achieved in a NOC in a large FPGA based design. In some systems it may be desirable to use a multiple stacked die design and such is illustrated in the next figure. With heterogenous routers, the goal for access to desired resource can also be achievable.

Figure 6:
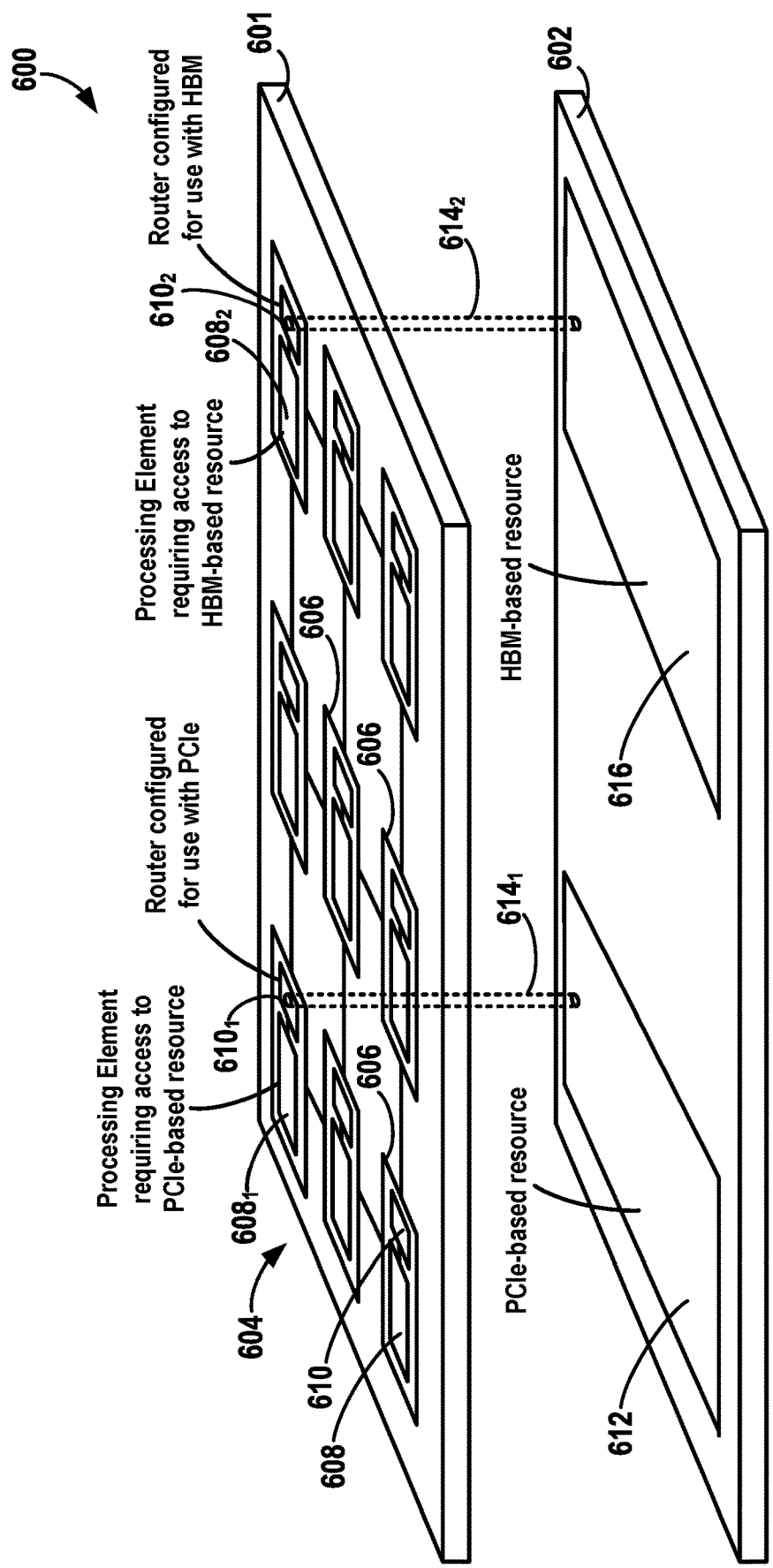
FIG. 6 illustrates an exemplary stack of dies that includes a first die with a NOC with heterogenous routers and a second die with physical resources accessed by the routers.

FIG. 6 illustrates a system 600 with a two-die stack of integrated circuits 601 and 602, with integrated circuit 601 (which may be an ASIC or an FPGA) including a NOC 604 of routers 610. The integrated circuit 601 also includes a grid of processing elements 608, each connected to a corresponding router 610. The routers 610 can be configured for use with a particular I/O protocol for use with a particular physical resource on the second integrated circuit 602. In particular, a first one of the processing elements 6081 is loaded with software or other logic requiring access to a PCIe-based resource 612 on integrated circuit 602. The corresponding router 6101 of the NOC 604 is configured for use with the PCIe I/O protocol and is coupled to the PCIe-based resource 612 using a TSV 6141. Although not shown, the PCIe-based resource 612 may be coupled to (or in communication with) other devices or resources that are not formed on the integrated circuit 602. A second one of the processing elements 6082 is loaded with software or other logic requiring access to a HBM-based resource 616 on integrated circuit 602. The corresponding router 6102 of the NOC 604 is configured for use with the HBM-based resource 616 using a TSV 6142. Although not shown, the HBM-based resource 616 may be coupled to (or in communication with) other devices or resources not formed on the integrated circuit 602. The other routers 610 of the NOC 604 of integrated circuit 600 may be standard or generic routers that are not configured for use with any particular I/O protocol. As already explained, the various processing elements may have the same physical configuration but are loaded with different software for performing different portions of an overall computational procedure. Also, as explained above, the PEs are not part of the NOC but are interconnected by the NOC.

Note that the illustration within FIG. 6 is an exploded view, which shows the two dies separated from one another with the TSVs shown in phantom lines so as to more clearly illustrate various features. In actuality, the two dies may be physically adjacent to one another with the TSVs physically coupling components of the adjacent dies. In some systems, there may be one or more intervening layers between the two dies. Also, the two-die stack of FIG. 6 is just one example of a multiple die stack in which a network of routers and a set of processing elements span multiple dies, and which may include three or more stacked dies. Still further, the two dies may include numerous other features and circuits, not shown in the figure, including bus lines, power lines, etc. The example of FIG. 6 shows that two of the routers of the NOC 604 are configured for particular I/O protocols. In other examples, more or fewer of the routers are so configured and, in some examples, each router is different from every other router. Still further, some routers may be configured for use with two or more I/O protocols.

Although the NOCs described herein are well-suited to FPGA devices, the NOCs may also be implemented as custom ASIC devices with, for example, a regular array of processing nodes to accommodate the irregular placement of physical resources through heterogeneous routers. When implementing as an ASIC, the internal design of the routers, their location in the integrated circuit, the locations of the physical resources, and their various interconnections may be manually configured and designed (e.g., hand routed). As noted above, for manycore designs, this may be complicated.

When implementing as an FPGA, otherwise standard routing tools (such as Xilinx Vivado) may be used along with otherwise standard (off the shelf) FPGA systems, such as Xilinx system-on-a-chip (SoC). The routing tooling may be constrained (via a detailed constraint file) so as to constrain the locations of the physical resources and the locations of the corresponding routers to be sufficiently close to one another to meet timing closer requirements and the like. The constraint file may also constraint the number of hops from certain processing elements to certain routers in the NOC. In at least some implementations, the NOC is specified as an overlay on top of a set of FPGA physical resources, where an overlay may be a reconfigurable architecture synthesized on a commercial off-the-shelf FPGA. As such, no special FPGA architecture is required. Rather, the heterogenous routers are designed and placed within an existing FPGA architecture based on the location of the physical resources of the FPGA. To accommodate the particular processing needs of a customer (such as to provide a NOC for use with a particular neuromorphic processing system), the designers of the NOC may work with the designers of the customer's processing software to determine what processing elements or cores in the client's SOC will require access to particular physical resources in an FPGA so that the routers can be designed and placed accordingly to meet those needs. Note that, in some case, existing FPGA router designs may be modified to implement the customized heterogenous routers.

Alternative and Additional Examples

Figure 7:
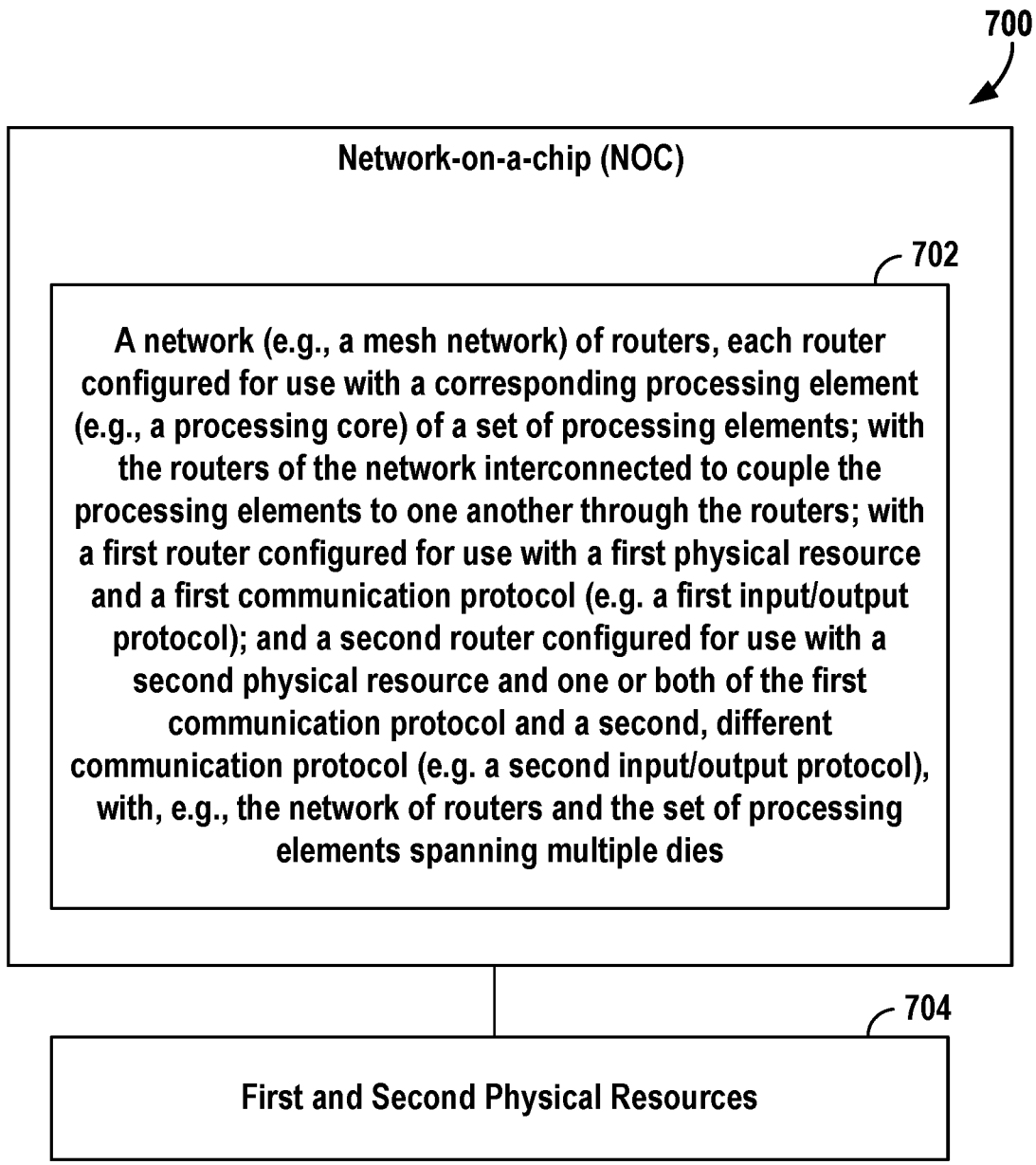
FIG. 7 is a block diagram of an exemplary NOC.

FIG. 7 is a block diagram of a NOC 700, which may be formed in an integrated circuit, such as an ASIC. The NOC includes a network of routers 702 (e.g., a mesh network), with each router configured for use with a corresponding processing element (e.g., a processing core) of a set of processing elements. The routers of the network are interconnected to couple the processing elements to one another through the routers. A first router is configured to use a first physical resource and a first communication protocol (e.g., a first I/O protocol such as ILKN). For example, the first physical resource may be used to communicate with a device at an opposing end of a communication channel using the first communication protocol. A second router is configured to use a second physical resource and one or both of the first communication protocol (e.g., ILKN) and a second, different communication protocol (e.g., a second I/O protocol such as HPIO). That is, in some examples, the first and second routers are configured to use the same protocol (though for use with different physical resources). In other examples, the first and second routers are configured to use different protocols. In still other examples, at least one of the routers may be configured to use both the first and second protocols. The second physical resource may be used to communicate with a device at an opposing end of another communication channel using the second communication protocol. The processing elements may share a common physical configuration. At least one of the routers (e.g., the first router) has a different physical configuration from at least one other router in the network (e.g., the second router) and may be configured for use with a particular physical resource. The network of routers and the set of processing elements may span multiple dies. The first and second physical resources 704 may be among a plurality or set of physical resources. The physical resources 704 may be formed in the same integrated circuit as the NOC, though in some examples the physical resources may be off-chip. In some aspects, the processing elements, the physical resources, and the NOC collectively form a SOC. In some aspects, the routers are formed in physical proximity to (e.g., physically adjacent to) the physical resources they are configured to manage (i.e., the routers can be located potentially anywhere on the integrated circuit to be close to the physical resources they manage).

Figure 8:
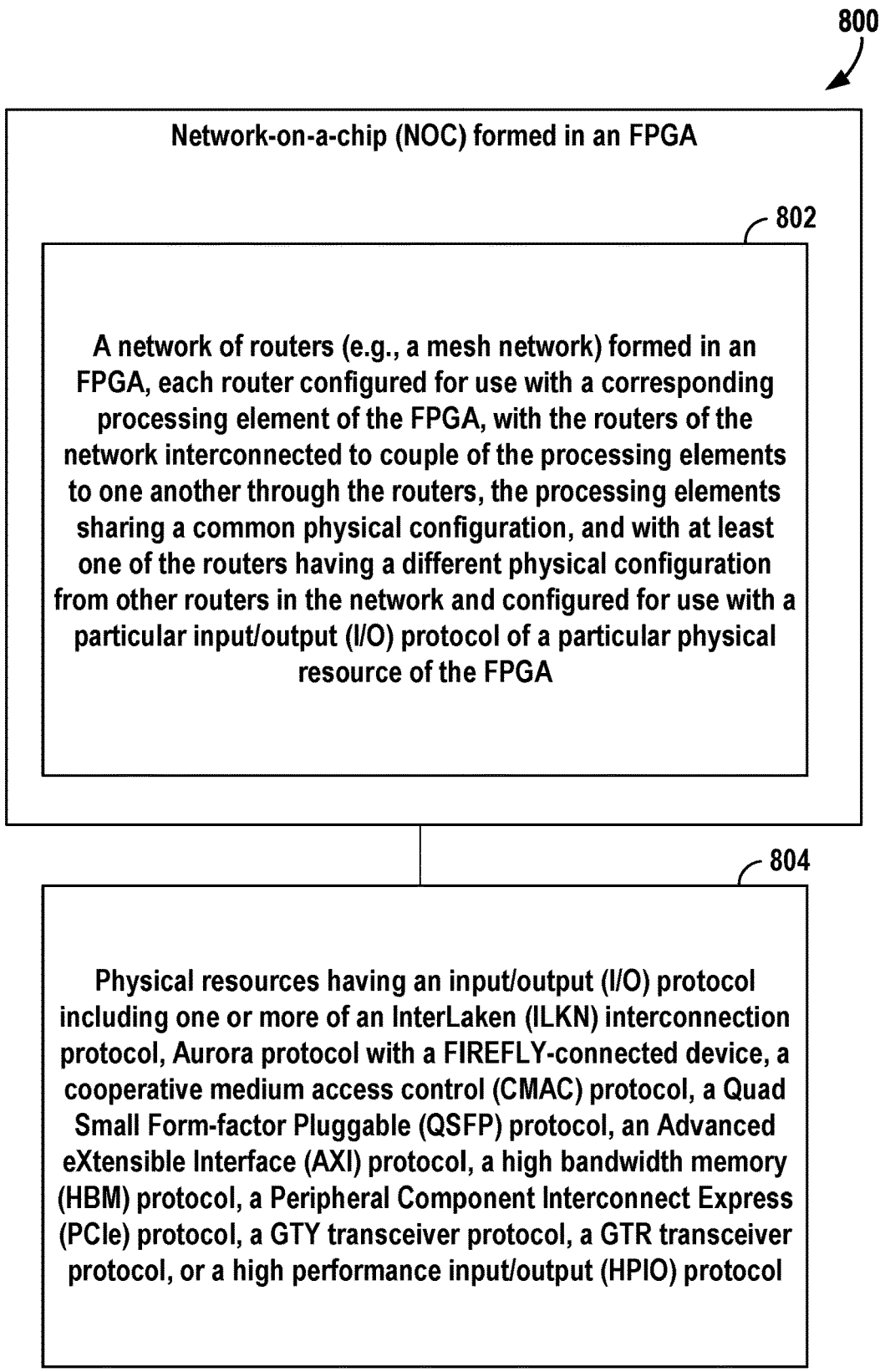
FIG. 8 is a block diagram of another exemplary NOC formed in an FPGA.

FIG. 8 is a block diagram of a NOC 800 formed in an FPGA. The NOC includes a network 802 (e.g., a mesh network) of routers, with each router configured for use with a corresponding processing element of the FPGA. The routers of the network are interconnected to couple the processing elements to one another through the routers. The processing elements share or comprise a common physical configuration. At least one of the routers has a different physical configuration from other routers in the network and is configured for use with a particular I/O protocol of a particular physical resource of the FPGA. The particular physical resource may be one of a group or plurality of physical resources 804. The physical resources 804 may be formed in the same FPGA as the NOC. The processing elements, which also may be formed in the same FPGA as the NOC, are not considered to be part of the NOC. In some aspects, the processing elements, the physical resources, and the NOC collectively form a SOC. The physical resources 804 may be resources with an I/O protocol including at least one of an ILKN protocol, a Aurora protocol, a CMAC protocol, a QSFP protocol, an AXI protocol, a HBM protocol, a PCIe protocol, a GTY transceiver protocol, a GTR transceiver protocol, or a HPIO protocol. The physical resources 804 may be formed in the same FPGA as the NOC, though in some examples the physical resources may be off-chip.

Figure 9:
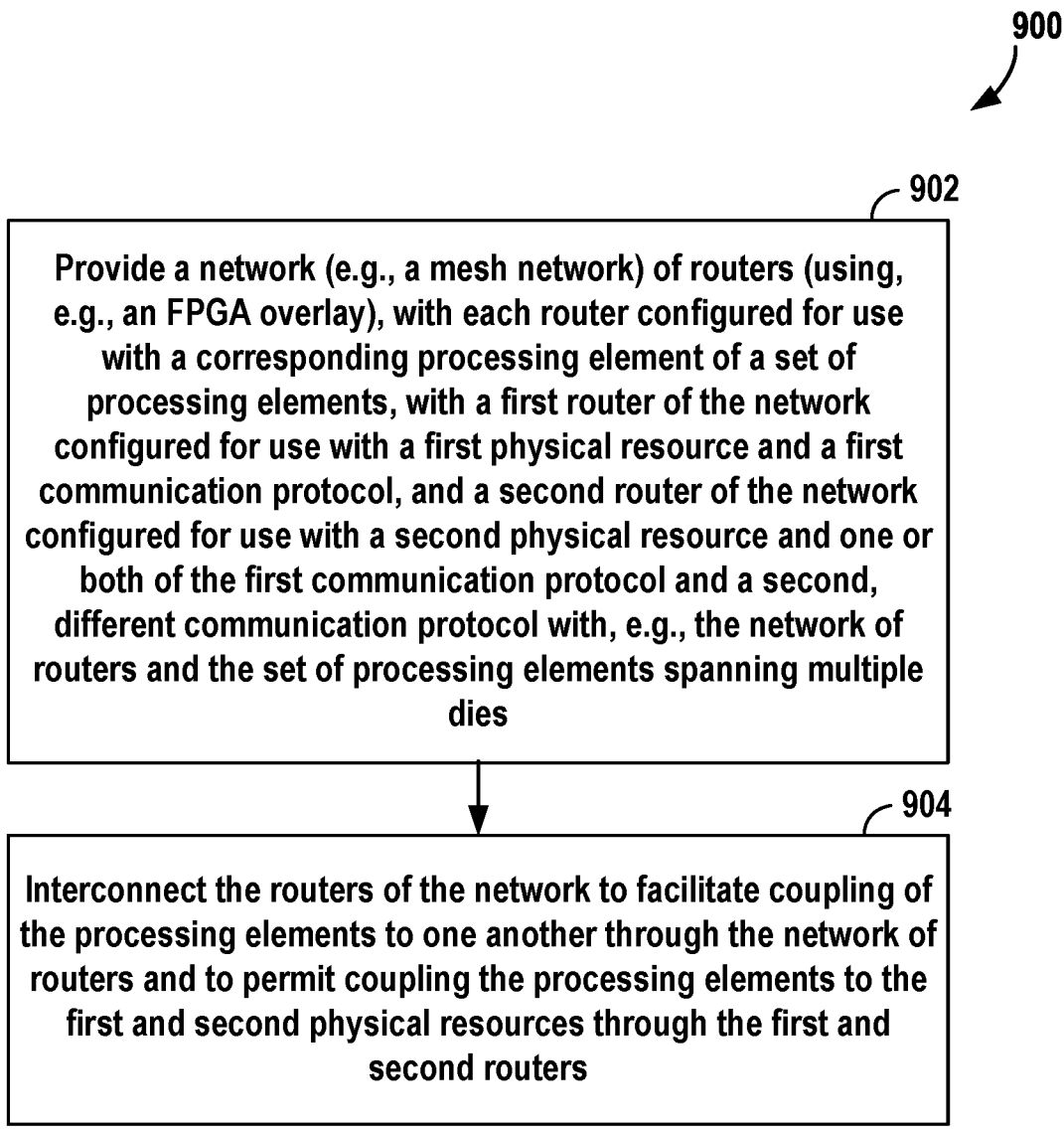
FIG. 9 illustrates an exemplary procedure for providing a NOC.

FIG. 9 is a flow chart illustrating a procedure 900 for providing a NOC. At block 902, the method provides a network (e.g., a mesh network) of routers (using, e.g., an FPGA overlay), with each router configured for use with a corresponding processing element of a set of processing elements. A first router of the network is configured to use a first physical resource to communicate with the other end of the communication channel and a first communication protocol (e.g., an I/O protocol such as ILKN). For example, the first physical resource may be used to communicate with a device at an opposing end of a communication channel using the first communication protocol. A second router of the network is configured to utilize use a second physical resource to communicate with the other end of the communication channel and one or both of the first communication protocol and a second, different communication protocol (e.g., an I/O protocol such as HPIO). That is, in some examples, the first and second routers are configured to use the same protocol (though for use with different physical resources). In other examples, the first and second routers are configured to use different protocols. In still other examples, at least one of the routers may be configured to use both the first and second protocols. The second physical resource may be used to communicate with another device at an opposing end of a different communication channel using the second communication protocol. The network of routers and the set of processing elements may span multiple dies. At block 904, the method includes interconnecting the routers of the network to facilitate or enable or permit coupling of the processing elements to one another through the network of routers and to permit coupling the processing elements to the first and second physical resources through the first and second routers. In some aspects, the routers are placed in physical proximity to the physical resources they are configured to manage (i.e., the routers can be located potentially anywhere on the integrated circuit of the NOC to be close to the physical resources they manage).

Figure 10:
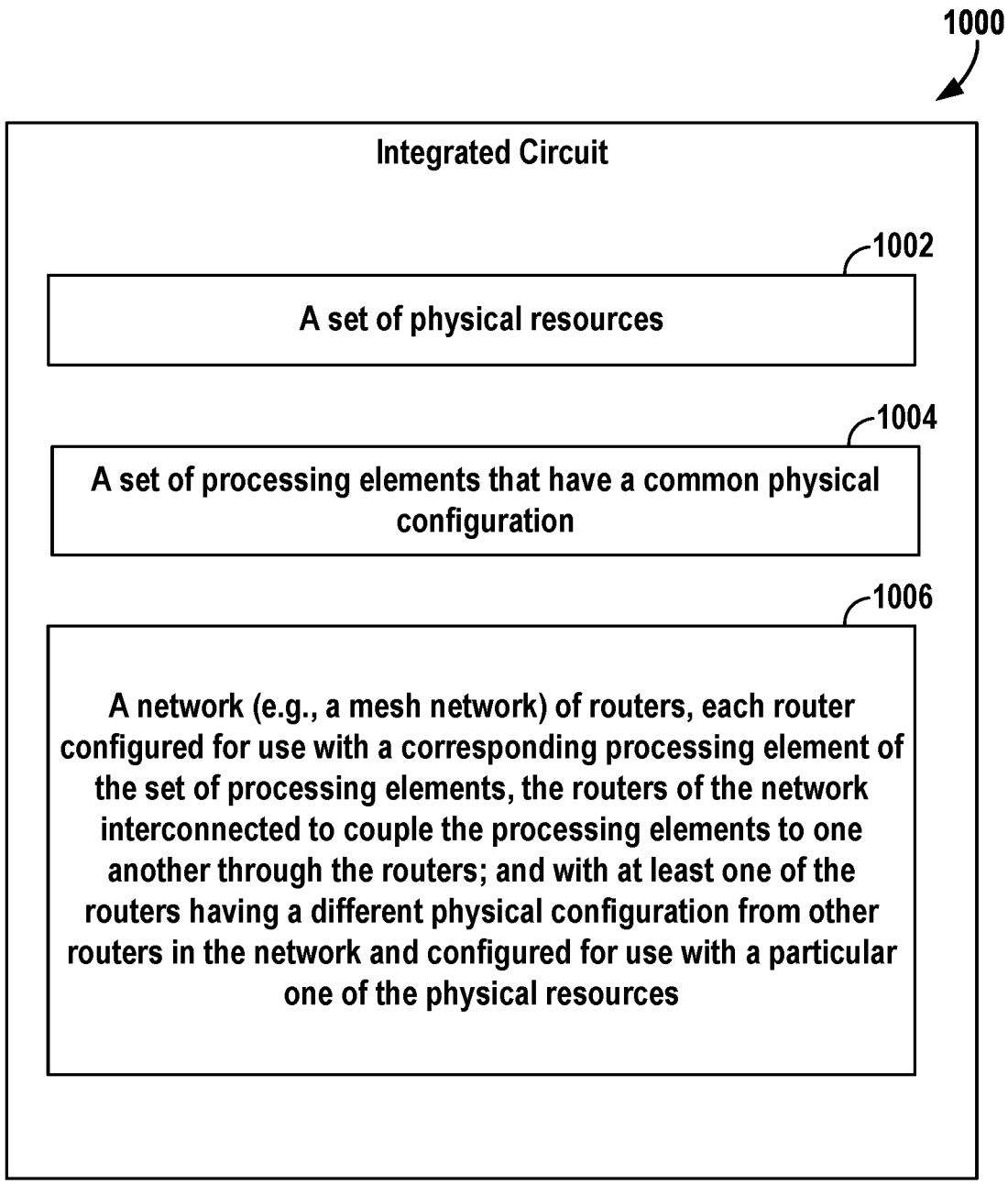
FIG. 10 is a block diagram of an exemplary integrated circuit.

FIG. 10 is a block diagram of an integrated circuit 1000. The integrated circuit 1000 includes a set (or plurality) of physical resources 1002 (such as ILKN resources or HPIO resources) and a set (or plurality) of processing elements 1004 that have or share a common physical configuration (such as a set of processing cores). The integrated circuit 1000 also includes a network (e.g., a mesh network) of routers 1006, with each router configured for use with a corresponding processing element of the set of processing elements 1004. The routers 1006 of the network are interconnected to couple the processing elements 1004 to one another through the routers. At least one of the routers 1006 has a different physical configuration from other routers in the network and is configured for use with a particular one of the physical resources 1002 (such as an ILKN resource or an HPIO resource). In some aspects, the integrated circuit is an SOC or includes an SOC.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A network-on-a-chip (NOC), comprising:
a network of routers, each router configured for use with a corresponding processing element of a plurality of processing elements;
wherein the routers are interconnected to couple the processing elements to one another;
wherein the routers comprise a first plurality of routers, each configured the same as the other routers of the first plurality of routers;
wherein the routers further comprise a second plurality of routers, each configured differently from one another and from the routers of the first plurality of routers; and
wherein each router of the second plurality of routers is configured to communicate with a corresponding physical resource of a plurality of physical resources using a communication protocol that is different from communication protocols used by the other routers of the second plurality of routers to communicate with their corresponding physical resources.

2. The NOC of claim 1, wherein the NOC is a mesh NOC.

3. The NOC of claim 1, wherein the NOC is implemented within a field programmable gate array (FPGA).

4. The NOC of claim 1, wherein the NOC is implemented within an application specific integrated circuit (ASIC).

5. An integrated circuit, comprising:
the NOC of claim 1;
the plurality of processing elements; and
the plurality of physical resources.

6. The integrated circuit of claim 5, wherein the processing elements each comprise a common physical configuration.

7. The integrated circuit of claim 5, wherein the processing elements comprise one or both of general purpose processing cores and intellectual property (IP) cores.

8. The integrated circuit of claim 5, wherein the physical resources comprise one or both of input/output (I/O) resources and memory resources.

9. The NOC of claim 1,
wherein a first router of the second plurality of routers is configured to communicate with a first physical resource of the plurality of physical resources using a first communication protocol; and
wherein a second router of the second plurality of routers is configured to communicate with a second physical resource of the plurality of physical resources using a second communication protocol that is different from the first communication protocol.

10. The NOC of claim 9, wherein the first communication protocol comprises an InterLaken (ILKN) communication protocol, a Aurora protocol, a cooperative medium access control (CMAC) protocol, a Quad Small Form-factor Pluggable (QSFP) protocol, an Advanced extensible Interface (AXI) protocol, a high bandwidth memory (HBM) protocol, a Peripheral Component Interconnect Express (PCIe) protocol, a GTY transceiver protocol, a GTR transceiver protocol, or a high performance input/output (HPIO) protocol.

11. The NOC of claim 10, wherein the second communication protocol comprises a different protocol than the first communication protocol from among the ILKN communication protocol, the Aurora protocol, the CMAC protocol, the QSFP protocol, the AXI protocol, the HBM protocol, the PCIe protocol, the GTY transceiver protocol, the GTR transceiver protocol, or the HPIO protocol.

12. The NOC of claim 1, wherein one or more of the routers and the processing elements span multiple dies.

13. A method for providing a network-on-a-chip (NOC), the method comprising:
providing a network of routers, each router configured for use with a corresponding processing element of a plurality of processing elements;
wherein the routers comprise a first plurality of routers, each configured the same as the other routers of the first plurality of routers; and
wherein the routers further comprise a second plurality of routers, each configured differently from one another and from the routers of the first plurality of routers;
communicating information among the network of routers using interconnection channels of the NOC;
communicating information between a first router of the second plurality of routers and a first physical resource using a first communication protocol; and
communicating information between a second router of the second plurality of routers and a second physical resource using a second communication protocol that is different from the first communication protocol.

14. The method of claim 13, wherein the first communication protocol comprises an InterLaken (ILKN) communication protocol, a Aurora protocol, a cooperative medium access control (CMAC) protocol, a Quad Small Form-factor Pluggable (QSFP) protocol, an Advanced extensible Interface (AXI) protocol, a high bandwidth memory (HBM) protocol, a Peripheral Component Interconnect Express (PCIe) protocol, a GTY transceiver protocol, a GTR transceiver protocol, or a high performance input/output (HPIO) protocol.

15. The method of claim 14, wherein the second communication protocol comprises a different protocol than the first communication protocol from among the ILKN communication protocol, the Aurora protocol, the CMAC protocol, the QSFP protocol, the AXI protocol, the HBM protocol, the PCIe protocol, the GTY transceiver protocol, the GTR transceiver protocol, or the HPIO protocol.

16. An integrated circuit, comprising:
a plurality of physical resources;
a plurality of processing elements that each comprise a common physical configuration;
a network of routers, each router configured for use with a corresponding processing element of the plurality of processing elements;
wherein the routers are interconnected to couple the processing elements to one another;
wherein the routers comprise a first plurality of routers, each configured the same as the other routers of the first plurality of routers;
wherein the routers further comprise a second plurality of routers, each configured differently from one another and from the routers of the first plurality of routers; and
wherein each router of the second plurality of routers is configured to communicate with a corresponding physical resource of a plurality of physical resources using a communication protocol that is different from communication protocols used by the other routers of the second plurality of routers to communicate with their corresponding physical resources.

17. The integrated circuit of claim 16, wherein the routers comprise portions of a mesh network-on-a-chip (NOC).

18. The integrated circuit of claim 16, wherein the processing elements comprise general purpose processing cores.

19. The integrated circuit of claim 16, wherein the physical resources comprise one or both of an input/output (I/O) resource and a memory resource.

20. The integrated circuit of claim 16,
wherein a first router of the second plurality of routers is configured to communicate with a first of the physical resources in accordance with a first communication protocol, and
wherein a second router of the second plurality of routers is configured to communicate with a second of the physical resources in accordance with a second communication protocol that is different from the first communication protocol.

21. The integrated circuit of claim 20, wherein the first communication protocol comprises an InterLaken (ILKN) communication protocol, a Aurora protocol, a cooperative medium access control (CMAC) protocol, a Quad Small Form-factor Pluggable (QSFP) protocol, an Advanced extensible Interface (AXI) protocol, a high bandwidth memory (HBM) protocol, a Peripheral Component Interconnect Express (PCIe) protocol, a GTY transceiver protocol, a GTR transceiver protocol, or a high performance input/output (HPIO) protocol.

22. The integrated circuit of claim 21, wherein the second communication protocol comprises a different protocol from among the ILKN communication protocol, the Aurora protocol, the CMAC protocol, the QSFP protocol, the AXI protocol, the HBM protocol, the PCIe protocol, the GTY transceiver protocol, the GTR transceiver protocol, or the HPIO protocol.

23. The integrated circuit of claim 20,
wherein a first processing element corresponding to the first router is programmed with logic configured to access the first of the physical resources, and
wherein a second processing element corresponding to the second router is programmed with logic configured to access the second of the physical resources.

24. The integrated circuit of claim 16, wherein one or more of the routers, the processing elements, and the physical resources span multiple dies.

25. A network-on-a-chip (NOC), comprising:
a network of routers, each router configured for use with a corresponding processing element of a plurality of processing elements;
wherein the routers are interconnected to couple the processing elements to one another;
wherein the routers comprise a first plurality of routers, each configured the same as the other routers of the first plurality of routers;
wherein the routers further comprise a second plurality of routers, each configured differently from one another and from the routers of the first plurality of routers;
wherein a first router of the second plurality of routers is configured to use a first physical resource and a first communication protocol; and
wherein a second router of the second plurality of routers is configured to use a second physical resource and one or both of the first communication protocol and a second communication protocol that is different from the first communication protocol.

26. The NOC of claim 25, wherein the first communication protocol comprises an InterLaken (ILKN) communication protocol, a Aurora protocol, a cooperative medium access control (CMAC) protocol, a Quad Small Form-factor Pluggable (QSFP) protocol, an Advanced eXtensible Interface (AXI) protocol, a high bandwidth memory (HBM) protocol, a Peripheral Component Interconnect Express (PCIe) protocol, a GTY transceiver protocol, a GTR transceiver protocol, or a high performance input/output (HPIO) protocol.

27. The NOC of claim 26, wherein the second communication protocol comprises a different protocol than the first communication protocol from among the ILKN communication protocol, the Aurora protocol, the CMAC protocol, the QSFP protocol, the AXI protocol, the HBM protocol, the PCIe protocol, the GTY transceiver protocol, the GTR transceiver protocol, or the HPIO protocol.

28. The NOC of claim 25, wherein the NOC is a mesh NOC.

29. The NOC of claim 25, wherein the NOC is implemented within a field programmable gate array (FPGA).

30. The NOC of claim 25, wherein the NOC is implemented within an application specific integrated circuit (ASIC).

* * * * *